Fig. 1.

(No Model.) 7 Sheets—Sheet 2.

N. SCHRODER & J. DE BEAUVAIS.
EGG TRAY MACHINE.

No. 252,264. Patented Jan. 10, 1882.

Witnesses:
Philip Mauro
Henry R. Elliott

Inventors
Nicholas Schroder and
Jules DeBeauvais by
Pollok their atty.

(No Model.)

N. SCHRODER & J. DE BEAUVAIS.
EGG TRAY MACHINE.

No. 252,264. Patented Jan. 10, 1882.

(No Model.) 7 Sheets—Sheet 6.

N. SCHRODER & J. DE BEAUVAIS.
EGG TRAY MACHINE.

No. 252,264. Patented Jan. 10, 1882.

Witnesses:
Philip Mauro
Henry R. Elliott

Inventors:
Nicholas Schroder and
Jules DeBeauvais by
Hollok their atty

(No Model.) 7 Sheets—Sheet 7.

N. SCHRODER & J. DE BEAUVAIS.
EGG TRAY MACHINE.

No. 252,264. Patented Jan. 10, 1882.

Witnesses:
Philip Lauro
Henry R. Elliott

Inventors
Nicholas Schroder and
Jules De Beauvais by
Hollok their atty

UNITED STATES PATENT OFFICE.

NICHOLAS SCHRODER, OF BROOKLYN, AND JULES DE BEAUVAIS, OF NEW YORK, N. Y.; SAID DE BEAUVAIS ASSIGNOR TO SAID SCHRODER; SAID SCHRODER ASSIGNOR TO GUSTAV L. JAEGER, OF NEW YORK, N. Y.

EGG-TRAY MACHINE.

SPECIFICATION forming part of Letters Patent No. 252,264, dated January 10, 1882.

Application filed February 10, 1881. (No model.)

*To all whom it may concern:*

Be it known that we, NICHOLAS SCHRODER, of Brooklyn, in the county of Kings and State of New York, and JULES DE BEAUVAIS, of New York, in the city and county of New York, have invented a new and useful Improvement in Egg-Tray Machines, which improvement is fully set forth in the following specification.

This invention relates to the manufacture by machinery of egg trays or carriers to be used in packing eggs for transportation. These trays or carriers are made of straw-board, and consist of two sets of interlocking strips, which intersect each other by the aid of partial cross-cuts in the two sets and form pockets of the size of a single egg.

Heretofore machines have been employed to make the strips themselves; but their assemblage into a tray has required hand-labor.

By the present invention hand-labor, except the general superintendence of the machine, can be done away with, the strips being formed from continuous webs of straw-board and united with each other automatically, and the completed trays being delivered onto the floor or a traveling apron, or into a suitable receptacle.

The mechanical or automatic assemblage of the strips is effected by the aid of holding-forms, which receive the "parallel longitudinal strips," as they may, for convenience, be called, and present them in position to receive the cross-strips with the cuts in the intersecting strips opposite each other. The forms are supported on a movable carrier. The strips, as they are formed by the strip-making mechanism, are seized by placing apparatus, which carries them forward and leaves them sticking in the holding-fingers of the form or intersecting the strips already placed therein. The placing apparatus can generally be relied upon to deliver the strips as desired; but for greater security bottoming apparatus, arranged to stripe the strips when released by the placers and force them home if not sufficiently advanced, is or may be employed.

Although the two sets of strips are or may be alike, it is most advantageous to form and deliver them by separate strip-making devices. These devices are composed, as heretofore, of a feeder to advance the straw-board, a puncher to punch by suitable dies the partial cross-cuts in the strips, and a clipper to sever the strips, and th y, together with the placing apparatus or placer and bottoming apparatus or bottomer, are therefore duplicated. As the most convenient arrangement, the carrier in the form of an endless belt with its holding-forms is placed in the middle, with the strip making and delivering mechanism on either side. The proper presentation of the forms to the two placers is effected by giving a quarter-turn thereto as they pass from one to the other. The release of the completed tray is effected by a discharging apparatus or dischargers.

In order that the intersecting strips with self-locking projections may not be liable after assembling to fall apart, the partial cross-cuts should be formed. The form preferably adopted is that described in Letters Patent No. 235,575, granted to N. Schroder, December 14, 1880, and the dies shown herein are designed for making the same, although the invention is not limited thereto. Strip-making mechanism of ordinary or suitable construction can be combined with the other elements of the improved machine. The invention, however, comprises also certain improvements in said mechanism, as hereinafter set forth, whereby the several parts are adapted to operate more efficiently by themselves and in connection with the other elements.

In order that the invention and the manner of carrying it into effect may be fully understood, a description will now be given of a machine constructed in accordance therewith, reference being had to the accompanying drawings, which form a part of this specification, and in which the same letters refer to like parts wherever they occur.

Figs. 4 and 5, views from opposite ends of the left-hand strip-making mechanism, Fig. 1, with placer and bottomer.

The same letters indicate like parts in all the figures and duplicate parts. The two feeders and other devices in the two strip mechanisms for example, are, unless otherwise indicated, represented by the same letters.

The frame of the machine comprises two side plates, A A', connected by cross bars, and in bearings in these plates the carrier-shafts B B' and the shafts C C' of the strip-making mechanisms are supported so as to extend across the space between them.

Sprocket-wheels D, fixed upon the shafts B B', support the carrier E, composed of two endless chains formed of pivoted links and suitably connected, as hereinafter described. The forms F are carried by suitable links of said chains.

The shafts C C' impart motion to the feeders G, the punchers H, the clippers I, placers K, and upper and lower bottomers, L L'. The dischargers M are operated by the lower carrier-shaft, B'. The upper and lower quarter-turns, N N', are formed by stationary devices, which act upon the forms as these are advanced by the carrier to give them a quarter-turn.

At the back of the plate A (see Figs. 1 and 3) is secured a check-piece, $A^2$, and a bracket, $A^3$. The main shaft $A^4$, supported in bearings in said bracket, check-piece, and side plate, carries a pulley, $a$, to receive motion from a counter-shaft overhead, a fly-wheel, $a'$, and gear $a^2$.

The shafts C C' are each provided with a gear, $a^3$, which are connected with the gear $a^2$ by intermediates $a^4$. The gears $a^3$ and intermediates $a^4$ have all the same number of teeth, and are all outside of the side plate A. The right-hand (Fig. 1) intermediate is keyed to a shaft, $a^5$, which extends through the side plate, and carries on its inner end a disk and crank-pin, $a^6$. Upon the shafts B B' are fixed the gears $b\ b'$, which intermesh with a gear-wheel, $b^2$, supported between them on a pin, $b^3$, fastened by a bracket to the side plate. A ratchet-wheel, $b^4$, is fastened to the gear $b^2$ and revolves with it. A lever, $b^5$, turns upon the pin $b^3$ and carries a pawl, $b^6$, which works in connection with the ratchet $b^4$. A connecting-rod, $b^7$, is jointed to the lever, and at its opposite end encircles the crank-pin $a^6$. In this way an intermittent rotary motion is imparted through the pawl-ratchet and gears to the shafts B B' and carrier E, and as the intermediates $a^4$ revolve with the same speed as shafts C C' the carrier and its forms are advanced one step for each revolution of the latter. While the carrier is stationary one strip from each of the strip mechanisms is placed in or on the forms, and at each movement the latter are advanced a distance equal to that which is to be between the parallel strips in the completed tray, so as to be brought into position to receive a new longitudinal and a new cross strip. The rolls of straw-board from which the strips are formed are supported by means of brackets $a^7$ at the ends of the machine-frame.

A more particular description will now be given of the several parts.

Figure 1:
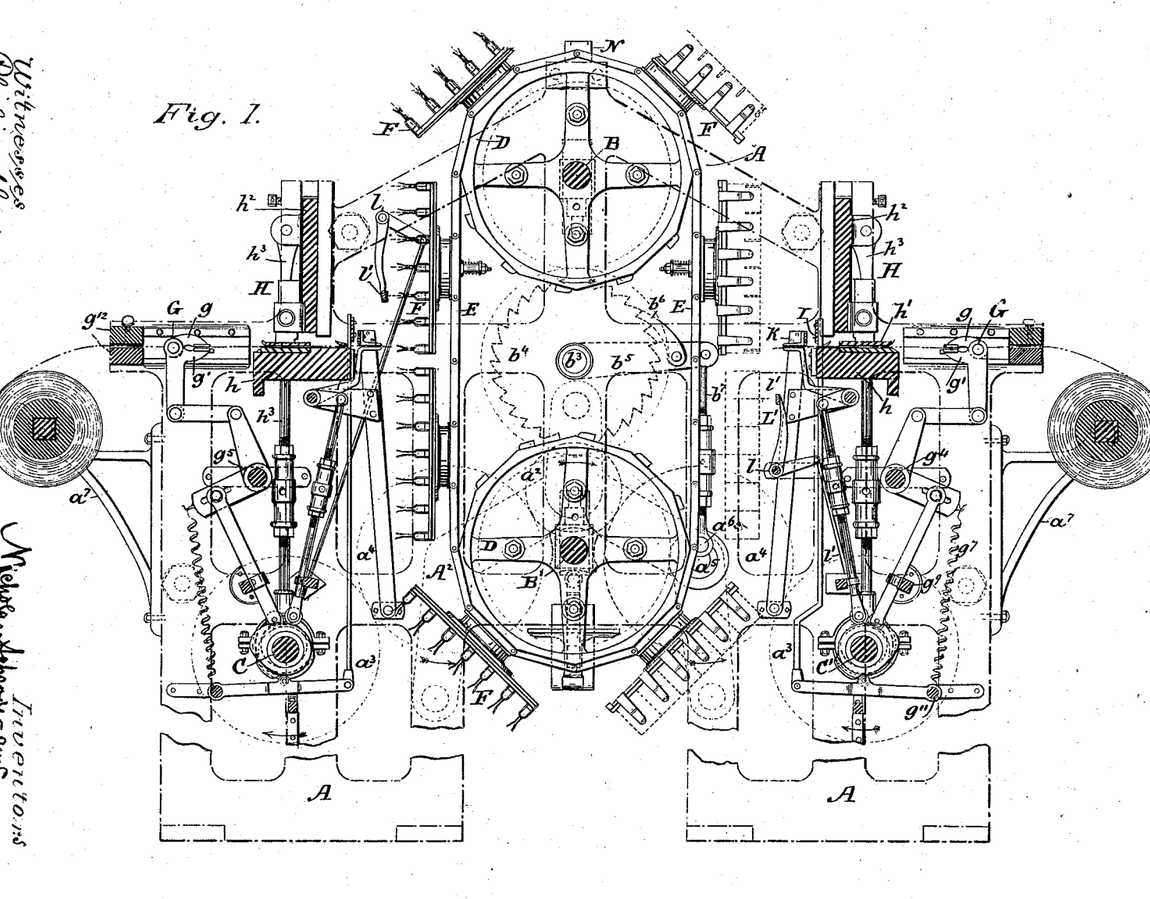
Figure 1 is a sectional elevation of the machine.
Figures 2, 11, 12:
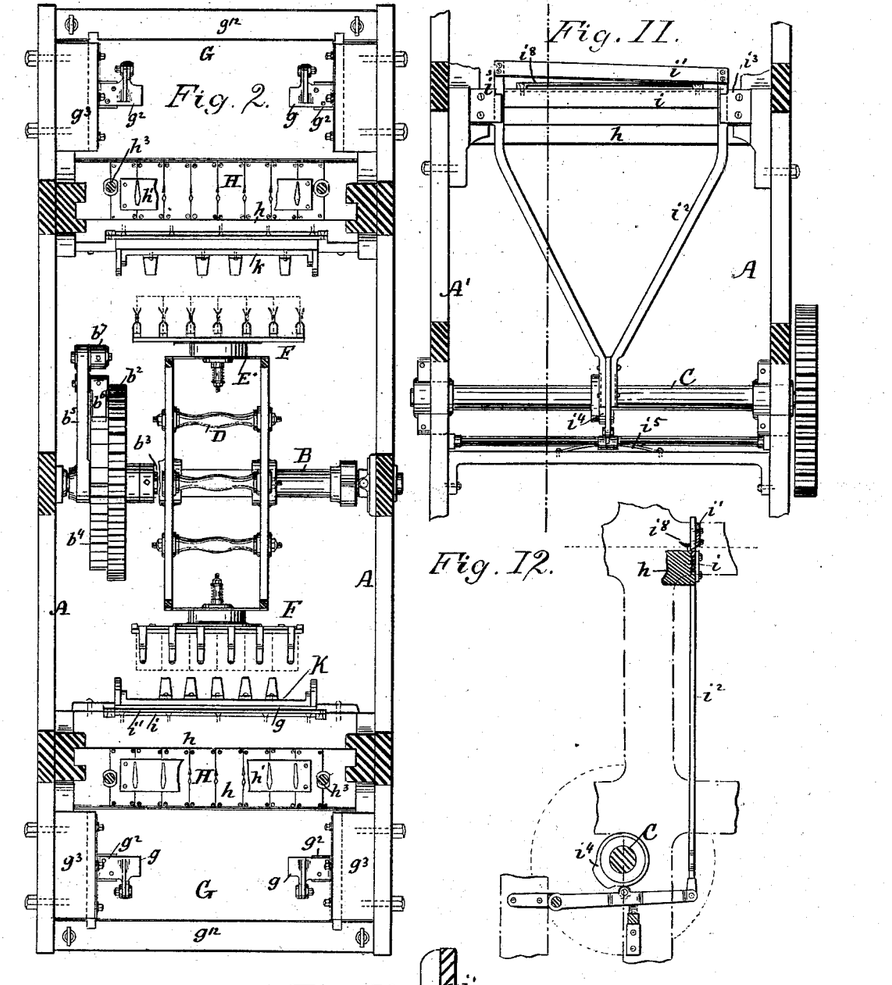
Fig. 2, a plan, partly in section, simplified by the omission of certain parts.
Figs. 11, 12, and 13, end view, sectional elevation, and partial section on an enlarged scale, illustrating the construction of clippers.
Figure 7:
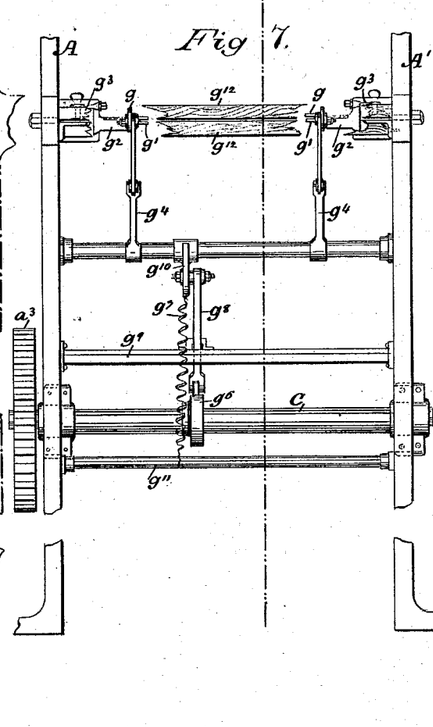
Figs. 7 and 8 are an end view and sectional elevation, respectively, illustrating the construction of the feeder.
Figure 8:
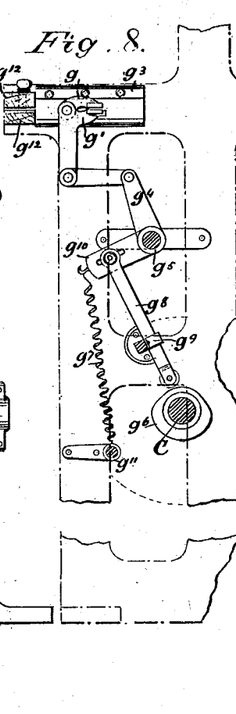

The feeders, Figs. 2, 7, and 8, comprise each a pair of gripers located on opposite sides of the path of the web of straw-board, and consisting of upper and lower jaws, $g\ g'$, with griping-plates at the side. The upper jaw is attached to or formed in one piece with a slide, $g^2$, supported in ways $g^3$, which are attached to the side plates, A A'. The lower jaw is pivoted to the former, and has a depending arm, which is connected by a link with an arm, $g^4$, of the rock-shaft $g^5$, journaled in bearings on the machine-frame. This shaft is common to the gripers of each pair and operates them simultaneously. A rocking motion is imparted to it by the cam $g^6$ on the shaft C or C' and the spring $g^7$, the cam acting through the connecting-rod $g^8$, which is guided by the cross-bar $g^9$ and a guide-piece fastened thereto, and of which the lower end is provided with a friction-roller, which rests in contact with the cam and the upper end jointed to an arm, $g^{10}$, on the rock-shaft by an adjustable connection. The connection is made adjustable by means of a slot in the end of the arm $g^{10}$, or in any suitable way, and is designed to regulate the motion of the gripers. The spring is shown as a spiral tension-spring, and is connected at one end with the arm $g^{10}$ and at the other with the stationary cross-bar $g^{11}$. When the connecting-rod is forced upward the depending arms of the lower jaws are drawn inward toward the center of the machine, Fig. 1, by the arms $g^4$ and connecting-links. The first action is to close the jaws, griping the web of straw-board between them, and then to advance the same, and thus feed along the straw-board. When the spring returns the rock-shaft the jaws are first opened and then returned for a new feed.

Between the gripers and the brackets $a^7$, Fig. 1, are cross-pieces $g^{12}$, fastened to the side plates by brackets and screws, and separated by a suitable distance, so as to receive between them the web of straw-board. They can be made to act as brakes and bear on the latter with an adjustable pressure, so as to furnish more or less resistance to the forward motion thereof as may be deemed necessary or desirable.

Figure 9:
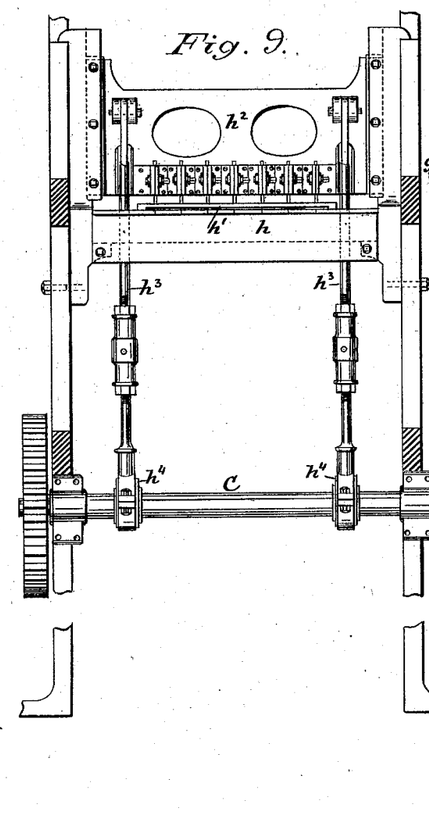
Figs. 9 and 10, an end view and plan of the puncher.
Figure 10:
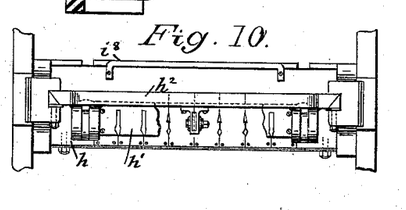

The punchers (see Figs. 1, 9, and 10) comprise each a bed-plate, $h$, on the upper surface of which the female dies are fastened, a stripper-plate, $h'$, between which and the said dies the web passes, and a cross-head, $h^2$, sliding in ways attached to the machine-frame and carrying the male dies formed of a series of single punches. The cross-head is reciprocated by connecting-rods $h^3$, the lower ends of which encircle eccentrics $h^4$, keyed to the shaft C or C'. The bed-plate being fastened to the side plate of the machine-frame strengthens the latter.

Figure 13:
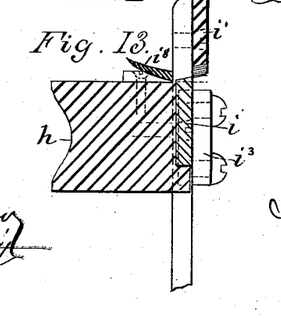

The clippers (see Figs. 11, 12, and 13) comprise a lower fixed shear-blade, $i$, secured to the bed-plate $h$, and upper movable blade, $i'$, with its edge inclined with reference to the lower shear-blade. The movable blade is fastened to the upper ends of a bifurcated frame, $i^2$, which is guided by the stationary spring-shoes $i^3$, and operated by the cam $i^4$ and spring $i^5$ through the intermediary of a lever, $i^6$, turning on or with a cross-bar, $g^{11}$, and jointed at the other end to the bifurcated frame. The cam acts on the upper side of the lever so as to depress the movable blade and the spring (shown as a bent leaf-spring attached to a stationary cross-bar) on the under side of said lever, so as to raise the movable blade and keep the friction-roller carried thereby always in contact with the cam. A holding bar or plate, $i^8$, holds the straw-board in position.

Figure 14:
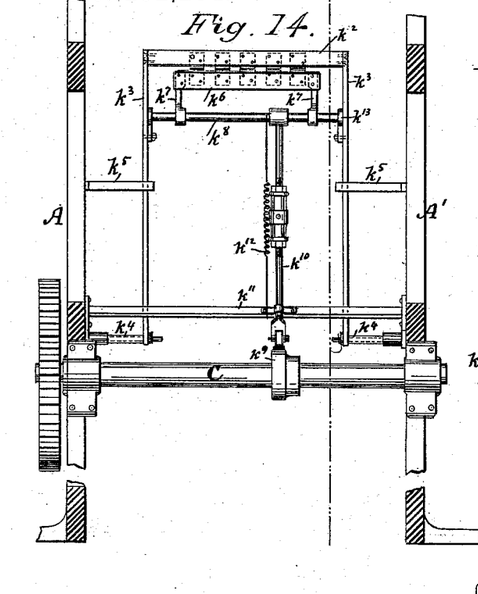
Figs. 14, 15, and 16, end view, section elevation, and plan of placer.
Figure 15:
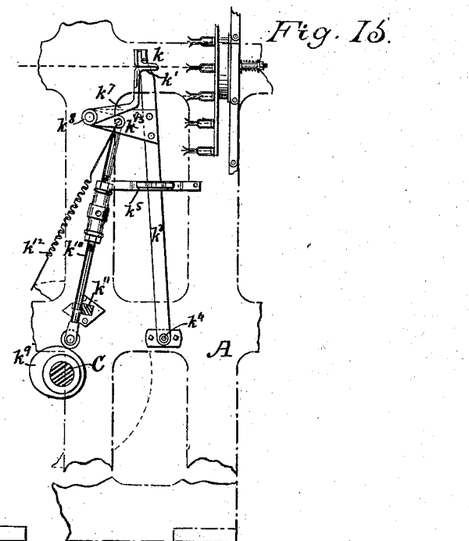
Figure 16:
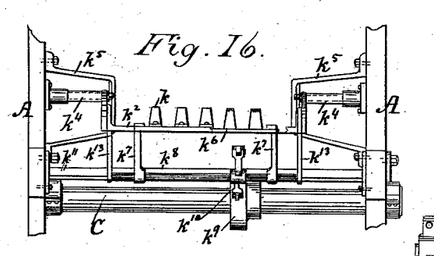

The placers, Figs. 14, 15, and 16, comprise a series of upper and a series of lower holding-fingers, $k$ $k'$, arranged in pairs. The upper fingers are fastened to a cross-bar, $k^2$, rigidly connected to uprights $k^3$, which are capable of turning upon the stationary pins $k^4$ upon the side plates of the machine-frame. Friction-brackets $k^5$ are employed to moderate the freedom of motion. The lower fingers are borne by a cross-bar, $k^6$, which is fastened to the arms $k^7$ of a rock-bar, $k^8$, journaled in brackets $k^{13}$, attached to the uprights $k^3$. The holding-fingers are closed and then advanced by the action of the cam $k^9$ on shaft C or C' through the connecting-rod $k^{10}$, this rod being journaled at its upper end to an arm of the rock-bar, and guided by a guide-piece on the cross-bar $k^{11}$, which allows to it a limited vibratory movement in a plane lengthwise of the machine. A spring, $k^{12}$, returns the parts to their first position, the holding-fingers first opening and then retreating. The friction-bracket, by holding back the upright $k^3$, insures that the fingers are fully closed or opened before they begin to advance or retreat. A series of holding-fingers with spaces between are used, so that they may enter between the spring-fingers of the forms (hereinafter described,) in placing the longitudinal strips, or between these in placing the cross-strips, and they are in number and arrangement adapted to this end.

Figure 17:
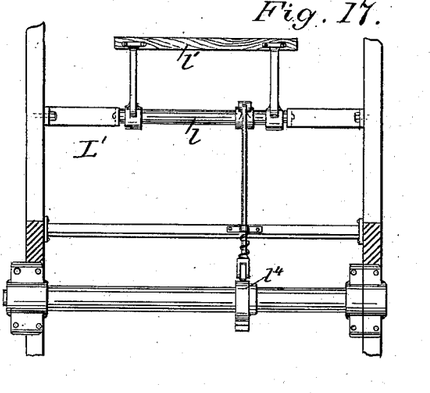
Figs. 17 and 18, an end view and plan of lower or right-hand (Fig. 1) bottomer.
Figure 18:
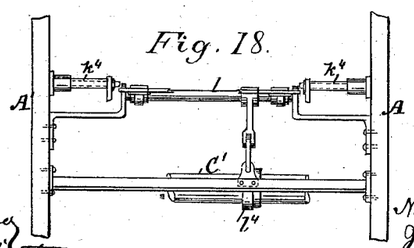

The bottomers comprise a rock-shaft, $l$, to arms of which a cross-strip, $l'$, is secured at the outer ends to form the striker. In the upper bottomer for forcing home the longitudinal strips (see Figs. 1 and 5) the arms extend downward and the rock-shaft is operated by the cams $l^2$ on the shaft C and the connecting-rods $l^3$. In the lower bottomer for forcing home or bottoming the cross-strips the arms extend upward (see Figs. 1, 17, and 18) and the rock-shaft is operated by a single cam, $l^4$, and connecting-rod on the shaft C'. The striker of the upper bottomer is above the plane in which the left-hand web of straw-board is fed and that of the lower bottomer below that in which the right-hand web is fed, because the motion of the carrier and forms is upward in front of the left-hand strip mechanism and downward in front of the right-hand strip mechanism.

Figures 19, 20, 21, 22, 23:
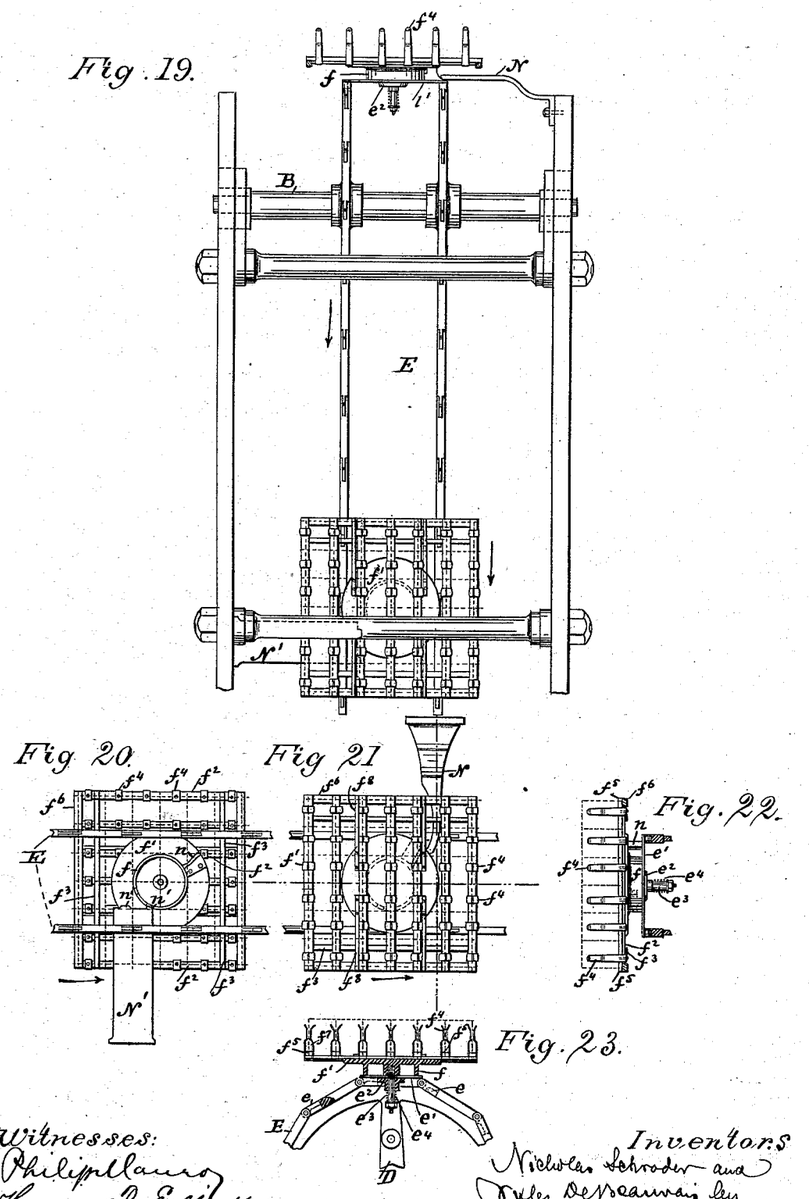
Fig. 19 is a view from the right-hand end, Fig. 1, of carrier and forms, with upper and lower quarter-turns.
Fig. 20, a plan of lower quarter-turn, representing also a bottom view of one of the forms.
Fig. 21, a similar view of upper turn, representing form in plan.
Figs. 22 and 23, sectional elevations of form in planes at right angles to each other, in dotted lines, Fig. 21.

The links of the carrier or double endless chain E are provided with holes or recesses $e$, Fig. 23, to receive the sprockets of the wheels or lanterns D. The bearings for the shafts B B', on which the wheels D are fixed, are made adjustable, so as to properly stretch the endless chains, and also to bring the forms in the right position in front of the placers. The forms themselves are carried by platens $e'$, Figs. 1, 19, 22, and 23, fastened to opposite links of the two chains. On the under or inner side of the platens perforated blocks $e^2$ are secured.

The forms, Figs. 19, 23, are composed of a base plate having a boss, $f$, and circular flange, $f'$, a series of lower strips, $f^2$, which are fastened by riveting or otherwise to the flange $f'$ and cross-strips $f^3$, and to which spring-fingers $f^4$ are fastened, and a series of upper strips, $f^5$, which are held between the fingers at their base and connected at their outer ends by cross-strips $f^6$. The strips $f^2$ $f^3$ are preferably of metal. Those indicated by $f^5$ $f^6$ are of wood. The spring-fingers are fastened at their lower ends only, and they are curved, as shown in Figs. 1 and 23, so that a recess, $f^7$, with inclined sides, is formed at the bottom between each pair, while their free ends closely approach each other. These recesses receive the strips $f^5$, which fit the same, so that when forced outward into the position shown in Fig. 24 the free ends of the fingers are caused to separate and release their pressure upon what is held between them. When, however, the strips are at the bottom of the recesses, as in Fig. 23, the fingers, by their elasticity, press together, ready to grasp the strips when placed between them. The arrangement of spring-fingers is in rows, which are equal in number to the longitudinal strips in each tray. The number of fingers in each row is one less than that of the cross-strips. Strips $f^8$ are connected at one end with the flange $f'$ and at the other with the cross-strips $f^6$, so that they tend to retain the strips $f^5$ at the bottom of recess $f^7$, and to return them to that position after they have been pressed forward by the discharger.

The forms are secured to the platens $e'$ by screw-pins $e^3$, which pass through the blocks $e^2$ and screw into the boss $f$, and springs $e^4$, which surround said pins, and by pressure against the heads of the pins and surface of the blocks maintain the boss $f$ in contact with the platens. The friction thus produced is not enough to prevent rotation of the form, but suffices to keep it in whatever position it may be placed by the appropriate devices or quarter-turns. The number of the forms and the arrangement of the spring-fingers on the forms are such that the distance between adjacent longitudinal and cross strips is equal to that between the strips on the same form. Preferably the forms are secured to each third link of the endless chain, as shown.

The quarter-turns comprise prongs N N', Figs. 1, 19, 20, and 21, attached to the side of the machine-frame and projecting horizontally outside the chains E, so that the flanges $f'$ of the forms pass over the upper and under the lower prong. Upon the lower side of the flange, Figs. 20 and 23, is riveted a block, $n$, which strikes against the upper prong, and the devices are so proportioned that the form revolves by a quarter-turn. The contact-surfaces are made like those of adjacent teeth in intermeshing gears. The lower prong, Fig. 20, is provided with projecting teeth $n'$, and there are holes in the boss $f$, into which said teeth enter by the revolution of the form and impart to the latter a quarter-turn in the reverse direction to that which in operation of the machine has been previously given to it by the upper turn.

Figure 3:
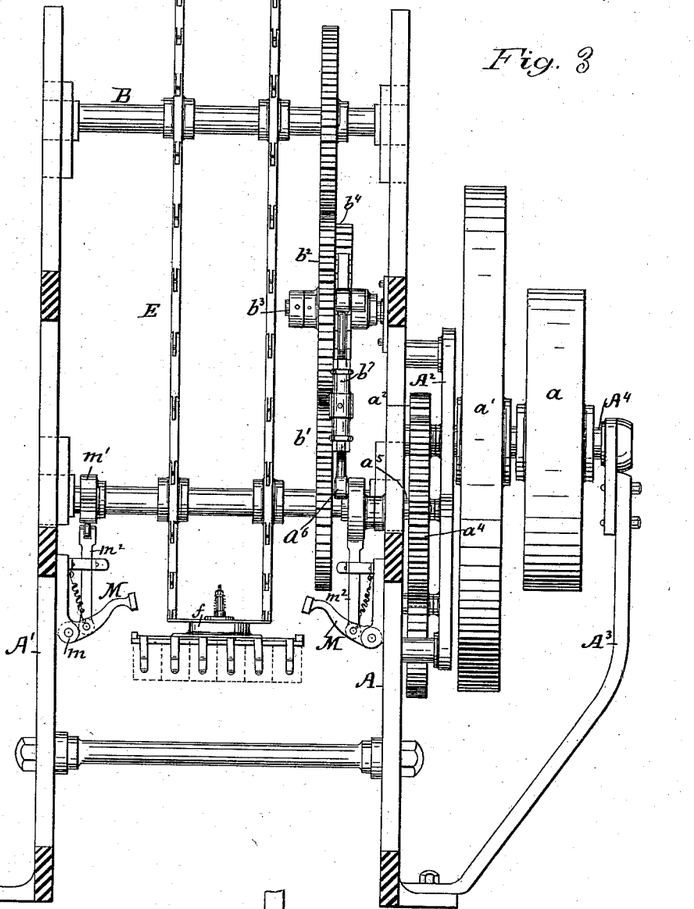
Fig. 3, an end elevation, showing a portion of the operating-gear, the carriers, and the discharger.
Figure 4:
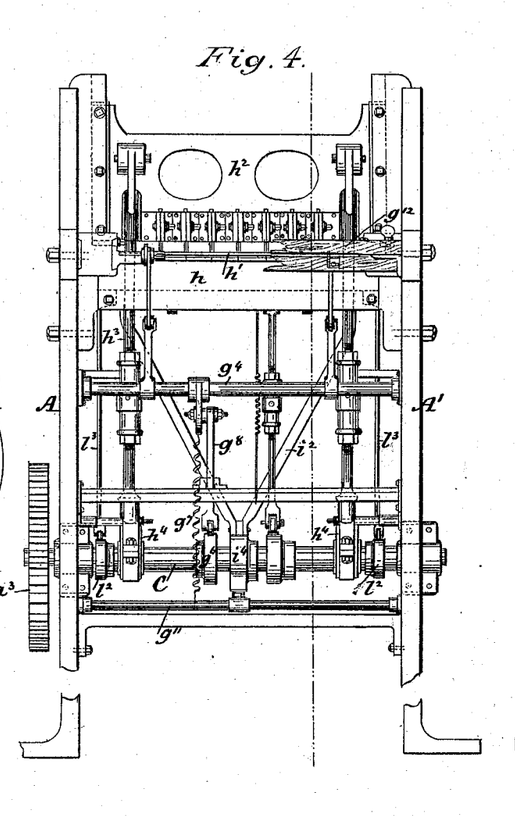
Figure 6:
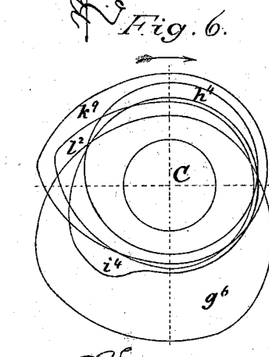
Fig. 6, a diagram on an enlarged scale, illustrating the shape and position of the cams shown in Figs. 4 and 5.
Figure 24:
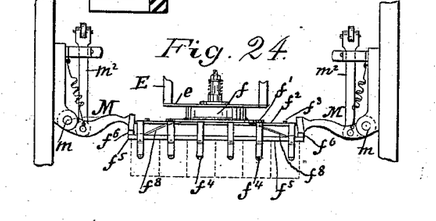
Fig. 24, a view in elevation of discharger and form when a completed tray is released from the form.

The dischargers M, Figs. 3 and 24, consist each of a lever pivoted at $m$ to a stationary bracket and operated by a cam, $m'$, on the lower carrier-shaft, B', and a spring, the cam acting through a connecting-rod, $m^2$. The cam forces down the outer ends of the levers as each form comes into position below them, so that they strike the cross-strips $f^4$, pressing apart the ends of the spring-fingers, as shown in Fig. 24. As shown, the operation takes place four times in the revolution of the shaft. The connecting-rods before indicated, except those of the dischargers and bottomers, are made extensible, as represented.

Instead of operating the discharger in the manner described, it could be operated from a cam-shaft or from the intermediate $a^4$ of the left-hand strip mechanism, Fig. 1. The dischargers could thus be made to act upon the forms when the latter are at rest.

The general construction and arrangement will be readily understood from an inspection of the drawings in connection with the foregoing description. Attention may, however, be called to the arrangement of the punchers and clippers, which in the left-hand strip mechanism is such that the solid part of each strip is presented to the form, so that the cuts open outward, while in the right or cross strip mechanism the open ends of the cuts are presented toward the center. With the form of dies illustrated the clippers sever the web on a line across the diamond-shaped opening at the left end, Fig. 2, of perforations made by the punchers. The clippers in the left-hand strip mechanism are, as represented, placed somewhat nearer the punchers than in the other, and the placer is given a correspondingly greater movement by the cam.

The operation of the machine is as follows: The rolls of straw-board, supported on a central cylinder having an axle extending through it, are placed with the ends of the axle in the brackets, and the web is led between the cross-pieces, thence between the griping-plates of the feeders, under the stripper-plate, under the holding bar or plate $e^8$, between the shear-blades of the clippers, and between the fingers of the placers. Motion is communicated to the main shaft by means of the endless belt upon the pulley fixed thereon. When the machine is first started the forms between the two strip mechanisms must be filled with longitudinal strips, and there must be several strips in process of making in both stop mechanism and before the formation of completed trays properly begins. This condition can be readily obtained by placing longitudinal strips in the proper forms by hand, and then, after starting the machine, removing any imperfect strips that may at first be produced. The web being fed intermittently forward, each strip is in succession punched, clipped, or severed from the web. The longitudinal strips are placed between the spring-fingers of the forms one at a time, and after advancing one step with the carrier are forced home or bottomed. The forms, as they pass the upper prong, N, or quarter-turn, are turned so that the strips are at right angles to their former positions. The cuts in the series of longitudinal strips are then in succession brought opposite the placer in the right-hand strip mechanism, and the cross-strips are placed and afterward forced home. The forms, as they pass the lower quarter-turns or prongs, N', are returned to their first position, and when under the discharger the completed trays are released.

Dividing the rotation of the cam-shafts into eight equal periods, taking the position shown in the principal figures of the drawings, when the carrier and forms have just come to rest, as the starting-point, the several parts operate as follows: The carrier remains stationary during the first four periods and advances during the last four. The gripers of the feeders close during the sixth period and advance the straw-board to the end of the second period in the next revolution of the shaft, when they stop, then open, and return during the fourth and fifth periods. The cross-heads of the punchers descend during the first four periods and ascend during the last four; but the punchers do not, of course, enter the straw-board until the feeders have ceased to advance it. The clipping takes place during the fourth and fifth periods. The placers, having closed upon the strips during the seventh and eighth periods of the preceding revolution, start forward and place the longitudinal strips between the spring-fingers of the form and the cross-strips in engagement with the longitudinal strips, then at the end of the second period open, and return to place at the end of the fourth period. The bottomers advance and retreat during the first four periods. The discharge and quarter-turns act at intervals of six revolutions.

Modifications may be made in the construction and arrangement of the various parts without departing from the spirit of the invention—for example, by a proper arrangement of forms and carriers a single strip mechanism and placer might be used for both longitudinal and cross strips.

Having now fully described the said invention and the manner of carrying the same into effect, what I claim, and desire to secure by Letters Patent, is—

1. The combination, with strip-making mechanism and a carrier and forms, of one or more placers, comprising clamps or holding-fingers for seizing the strips made by aforesaid mechanism and inserting them in said forms, substantially as described.

2. The combination of the carrier with a series of forms movable with and upon said carrier, and quarter-turns for acting successively on said forms, substantially as described.

3. The combination, with a form having clamps or spring-fingers, of a placer having clamps or holding-fingers and operating in connection with said form, substantially as described.

4. The combination, with a carrier and form supported thereby on a swivel or by a pivoted connection, of a quarter-turn for revolving said form, substantially as described.

5. The combination of a placer, form, and bottomer, substantially as described.

6. The carrier consisting of an endless belt or chain, supporting a series of swiveled forms, substantially as described.

7. The combination, with the endless belt and swiveled forms supported thereby, of the upper and lower quarter-turns, substantially as described.

8. The combination, in a form, with the boss supporting the clamps, of devices, substantially as described, for revolving said forms by engagement with other devices, as set forth.

9. The combination, with a carrier, one or more forms, and mechanism for advancing said carrier and forms, of one or more dischargers supported upon the machine-frame, and a revolving cam for operating said dischargers, substantially as described.

10. The combination, with an endless belt or chain and one or more forms carried by said belt or chain and projecting beyond it at the sides, of one or more dischargers arranged to act upon the projecting portion, substantially as described.

11. The combination, with one or more forms comprising clamps or spring-fingers and releasing devices, as indicated, of one or more dischargers for acting upon said devices to relieve the pressure of the clamps or spring-fingers, substantially as described.

12. A form comprising, in combination with the base-plate and a number of clamps or spring-fingers, releasing devices, as explained, carried by the base-plate, for simultaneously releasing the pressure of said clamps or fingers, substantially as described.

13. The combination, with one or more pairs of holding-fingers hinged together and carried by pivoted uprights, of a cam and connections for closing and advancing and opening and returning said holding fingers, substantially as described.

14. The combination, with one or more pairs of jaws or clamps hinged together and carried by a reciprocating support or supports to which one jaw or set of jaws is attached, of one or more operating rods or links connected with the other jaw or set of jaws, and a brake or friction devices for delaying the advance of said jaws, and thus securing the forcible biting or clamping of the same upon the material between them, substantially as described.

15. The combination, with a strip-making mechanism, of a placer comprising two clamping devices or sets of holding-fingers for receiving the strips when made, and operating means, substantially as described.

16. The combination, with an intermittently-operated carrier and forms, of a placer having clamping-plates or holding-fingers and also operated intermittently, and strip-making mechanism, substantially as described.

17. The combination of the strip mechanism for making the longitudinal cross-strips, the forms with spring-fingers, and carriers for receiving and conveying the strips, the placers with holding-fingers for receiving the strips as made and placing them in position, and the upper quarter-turn for revolving the forms after the longitudinal strips have been placed in the forms so as to bring them into position for receiving the cross-strips, substantially as described.

18. A machine for making egg-trays, comprising, in combination, duplicate feeders, punchers, clippers, and placers, a chain or endless belt, swiveled forms carried thereby, upper and lower quarter-turns or stationary prongs, and discharging apparatus, substantially as described.

19. In a machine of the character described, the combination, with an intermittently-rotating carrier, of an independent form pivotally connected with the carrier and intermittently carried around by the same, and having on its face a series of projecting receivers or clamps, substantially as described.

20. The combination, with an intermittently-rotating carrier, of a series of independent forms pivotally connected with and intermittently carried around by the carrier, and provided on their faces with projecting receivers or clamps, substantially as described.

21. The combination, with the series of independent forms pivotally connected with the intermittently-rotating carrier, and provided on their faces with projecting receivers or clamps, of the discharger arranged beneath the carrier, and mechanism substantially such as described, connected with said discharger, for intermittently reciprocating the same as the forms are brought around in the part of the discharger, substantially as described.

22. The combination of an intermittently-rotating carrier and a series of independent forms pivotally connected with and intermittently carried around by the carrier, and having on their front faces the projecting receivers or clamps, with the placer and the cutting and slotting dies, substantially as described.

23. The combination, with the form and its clamps or receivers, and with the placer, of the clamps or placer, substantially as described.

In testimony whereof we have signed this specification in the presence of two subscribing witnesses.

NICHOLAS SCHRODER.
J. DE BEAUVAIS.

Witnesses:
JOHN CAVAGNARS,
EDWARD STEGEMAN.